United States Patent [19]
Golley

[11] Patent Number: 5,533,679
[45] Date of Patent: Jul. 9, 1996

[54] GRINDING ALKALINE EARTH METAL PIGMENTS

[75] Inventor: Christopher R. L. Golley, St. Austell, United Kingdom

[73] Assignee: ECC International Limited, United Kingdom

[21] Appl. No.: 209,006

[22] Filed: Mar. 10, 1994

[30] Foreign Application Priority Data

Mar. 12, 1993 [GB] United Kingdom ............... 9305087

[51] Int. Cl.$^6$ .................................................. B02C 23/18
[52] U.S. Cl. ................................................. 241/17; 241/21
[58] Field of Search ................................. 241/16, 17, 21, 241/29

[56] References Cited

U.S. PATENT DOCUMENTS

| | | | |
|---|---|---|---|
| 3,989,195 | 11/1976 | Falcon-Steward | 241/16 |
| 4,166,582 | 9/1979 | Falcon-Steward | 241/16 |
| 4,251,351 | 2/1981 | Bowman | 241/16 |
| 4,325,514 | 4/1982 | Hemingsley | 241/21 X |
| 4,606,503 | 8/1986 | Bleeck | 241/21 X |
| 4,793,985 | 12/1988 | Price et al. . | |
| 5,036,599 | 8/1991 | Thompson . | |
| 5,181,662 | 1/1993 | Bousquet et al. | 241/16 |

FOREIGN PATENT DOCUMENTS

| | | |
|---|---|---|
| 1161010 | 1/1984 | Canada . |
| 0027996 | 5/1981 | European Pat. Off. . |
| 0108842 | 5/1984 | European Pat. Off. . |
| 0276077 | 7/1988 | European Pat. Off. . |
| 2243982 | 4/1975 | France . |
| 2306939 | 11/1976 | France . |
| 2347417 | 11/1977 | France . |
| 1204511 | 9/1970 | United Kingdom . |
| 1309074 | 3/1973 | United Kingdom . |
| 1519528 | 8/1978 | United Kingdom . |
| 1537512 | 12/1978 | United Kingdom . |
| 1569969 | 6/1980 | United Kingdom . |
| 1597190 | 9/1981 | United Kingdom . |
| 1599632 | 10/1981 | United Kingdom . |
| 2200103 | 7/1988 | United Kingdom . |
| 2251254 | 7/1992 | United Kingdom . |
| WO87/00446 | 1/1987 | WIPO . |

*Primary Examiner*—Timothy V. Eley
*Attorney, Agent, or Firm*—Klauber & Jackson

[57] ABSTRACT

There is disclosed a process for producing a finely ground alkaline earth metal pigment. The process comprises the steps of:

(a) preparing an aqueous suspension comprising from 40 to 70% by weight of a particulate alkaline earth metal compound, such as calcium carbonate;

(b) subjecting the suspension formed in step (a) to attrition grinding with a particulate grinding medium under conditions such as to yield a product having a particle size distribution such that at least 90% by weight of the particles have an equivalent spherical diameter smaller than 2 μm, and preferably at least 80% by weight of the particles have an equivalent spherical diameter smaller than 1 μm; and (c) allowing water to evaporate from the suspension under the action of heat contained in the suspension until the percentage by weight of dry alkaline earth metal compound in the suspension is at least 70% by weight.

16 Claims, 1 Drawing Sheet

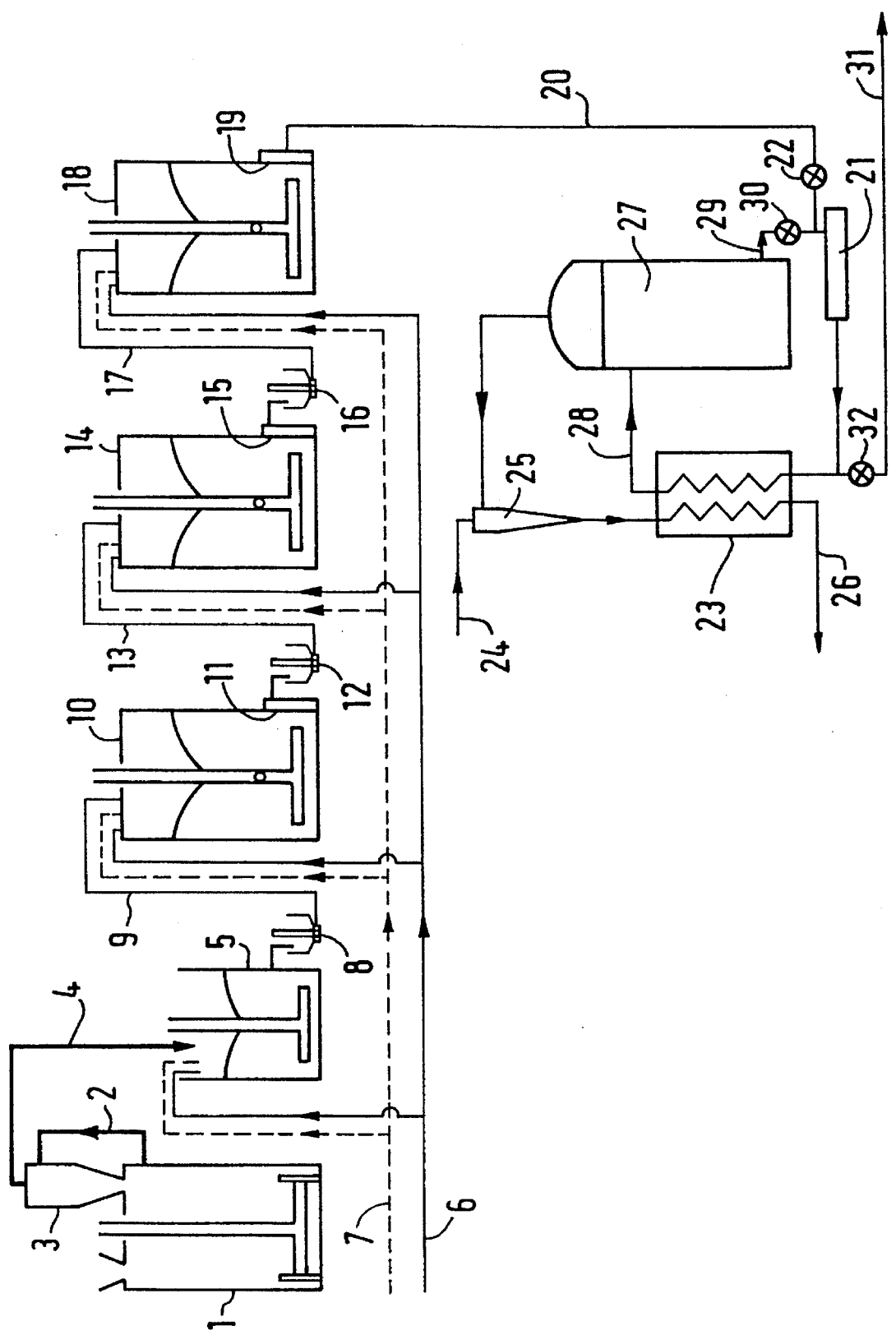

5,533,679

GRINDING ALKALINE EARTH METAL PIGMENTS

This invention concerns an improved process for comminuting in the wet state alkaline earth metal pigments, in particular, but not exclusively, calcium carbonate pigments.

Hitherto, alkaline earth metal pigments have generally been comminuted in the wet state either in an aqueous suspension having a high solids content, for example from about 70 to 78% by weight of dry solids, or in an aqueous suspension having a relatively low solids content, for example less than 40% by weight of dry solids.

The high solids content route has the advantage that less water is used to suspend the pigment, and therefore little or no water has to be removed from the ground pigment for transport and sale. In fact, in many cases the comminuted pigment is transported and sold in the form of a concentrated suspension, and this high solids route produces a suspension which is directly suitable for this purpose without further treatment. A dispersing agent for the alkaline earth metal pigment must be used in this route, and the route suffers from the disadvantage that a relatively high proportion of ultra-fine particles, i.e. having an equivalent spherical diameter smaller than 0.25 µm, is produced which renders the suspension more viscous and necessitates the use of a larger quantity of the dispersing agent, or of a dispersing agent which is specially prepared to yield suspensions of relatively low viscosity at high solids concentrations, and is therefore very expensive.

The low solids route has the advantage that no dispersing agent for the pigment is required, but it is found that the grinding efficiency, as measured in terms of the increase in the percentage by weight of the pigment particles having an equivalent spherical diameter smaller than, say, 2 µm per unit of energy dissipated in the grinding process, is relatively low. The route has the further disadvantage that a large quantity of water has to be separated from the pigment before the pigment can economically be transported and sold.

According to a first aspect of the present invention, there is provided a process for producing a finely ground alkaline earth metal pigment comprising the steps of:

(a) preparing an aqueous suspension comprising from 40 to 70% by weight of a particulate alkaline earth metal compound;

(b) subjecting the suspension formed in step (a) to attrition grinding with a particulate grinding medium under conditions such as to yield a product having a particle size distribution such that at least 90% by weight of the particles have an equivalent spherical diameter smaller than 2 µm; and (c) allowing water to evaporate from the suspension under the action of heat contained in the suspension until the percentage by weight of dry alkaline earth metal compound in the suspension has increased to at least 70% by weight.

The alkaline earth metal compound will generally be an alkaline earth metal carbonate or sulphate, such as, for example, calcium carbonate, calcium sulphate, barium sulphate, strontium carbonate and the like.

In step (a) the alkaline earth metal compound preferably has a particle size distribution such that substantially all (i.e. at least 95% by weight) of the particles are smaller than 100 µm. More preferably, the alkaline earth metal compound has a particle size distribution such that substantially all of the particles are smaller than 53 µm.

In step (a), the aqueous suspension may include a dispersing agent for the alkaline earth metal compound, in an amount effective to disperse the particles of the particulate material. The dispersing agent is preferably a water soluble salt of a homopolymer or copolymer of acrylic acid or methacrylic acid having a number average molecular weight of less than about 20,000. A sodium polyacrylate having a number average molecular weight in the range from 1,500 to 5,000 is especially preferred. The quantity of the dispersing agent used is preferably in the range from 0.1 to 2.0% by weight, based on the weight of dry alkaline earth metal compound.

In step (b) the suspension is preferably subjected to attrition grinding under conditions such as to yield a product having a particle size distribution such that at least 80% by weight of the particles have an equivalent spherical diameter smaller than 1 µm, more preferably such that at least 90% by weight of the particles have an equivalent spherical diameter smaller than 1 µm. The particulate grinding medium preferably consists of particles having an average particle diameter in the range from 0.1 to 5.0 mm, more preferably in the range of from 0.25 to 4.0 mm. The particulate grinding medium may be, for example, silica sand or granules of alumina, zirconia, zirconium silicate, aluminium silicate or the mullite-rich material which is produced by calcining kaolinitic clay at a temperature in the range from 1300° to 1800° C.

The grinding may be carried out in one stage, but it is preferred that it is carried out in two or more stages. For example the feed suspension may be partially ground in a first attrition grinder, the suspension of partially ground alkaline earth metal compound then being fed to a second attrition grinder for further grinding, after which the suspension of ground product from the second grinder is fed to a third attrition grinder.

In step (c), the heat under whose action water is allowed to evaporate from the suspension may be that which has been generated in the suspension as a direct result of the attrition grinding carried out in step (b). For example, during the grinding step the temperature of the suspension may rise to the boiling point of the aqueous phase of the suspension which will normally be around 100° C., and evaporation of water occurs naturally under the action of the heat contained in the suspension. It is not essential however, that the temperature of the suspension rises to its boiling point. The heat contained in the suspension as a result of the energy dissipated in the suspension during grinding may be sufficient to increase the percentage by weight of dry alkaline earth metal compound in the suspension to within the range from 70 to 80% by weight. It is preferred that the amount of energy dissipated in the suspension during grinding is in the range of from 100 to 500 KWh/tonne of dry alkaline earth metal compound.

Alternatively, or in addition to the heat contained in the suspension as a result of the grinding step, the suspension may be heated by a heating means such as a heat exchanger to a temperature within the range of from 50° C. to the boiling point of the suspension, preferably to within the range of from 70° to 80° C. For instance, heat may be supplied to the suspension by passing the suspension through one side of a non-contact heat exchanger through the other side of which is passed a hot fluid, preferably at a temperature in the range from 50° to 100° C. Advantageously the suspension which has been heated as a result of grinding and/or by the heating means (e.g. a non-contact heat exchanger) is exposed to reduced pressure, preferably to a vacuum of at least 650 mm of mercury below atmospheric pressure (−0.867 bar) and more preferably at least 700 mm of mercury below atmospheric pressure (−0.933 bar).

According to a second aspect of the present invention, there is provided an aqueous suspension of a finely ground alkaline earth metal pigment whenever prepared by the process of the first aspect of the present invention.

According to a third aspect of the present invention, there is provided a high solids aqueous suspension of a finely ground alkaline earth metal pigment having a particle size distribution such that at least 80% by weight of the particles have an equivalent spherical diameter smaller than 1 μm and wherein the percentage by weight of dry alkaline earth metal compound in the suspension is at least 70% by weight. Preferably, the high solids aqueous suspension of a finely ground alkaline earth metal pigment has a particle size distribution such that at least 80% by weight of the particles have an equivalent spherical diameter smaller than 1 μm.

The invention will now be illustrated, by way of example only, by reference to the accompanying drawing which shows a flow diagram for one arrangement of processing equipment which can be used to carry out the process of the invention.

The processing equipment illustrated in the figure comprises a dry rotary roller grinder 1 which has a perforated base (not shown). A conduit 2 leads from an upper region of the grinder 1 to a cyclone 3 which communicates both with the grinder 1 and a conduit 4 which leads to a mixing tank 5. Further conduits 6 and 7 extend to the mixing tank 5 for the introduction therein of water and dispersing agent. A pump 8 is provided to transfer material from the mixing tank 5 via a conduit 9 to a first wet attrition grinder 10. A sieve 11 is provided at the bottom of the grinder 10. Adapted to collect material from the grinder 10 is a pump 12 which is connected, through a conduit 13, to a second wet attrition grinder 14. The second grinder 14 is provided with a sieve 15 and an associated pump 16 adapted to collect material from the grinder 14 and transfer it, through a conduit 17, to a third wet attrition grinder 18.

The third wet attrition grinder 18 is provided with a sieve 19 at its outlet, an associated conduit 20 and a pump 21. Flow through the conduit 20 is controlled by means of a valve 22. Downstream of the pump 21 is provided a plate and frame heat exchanger 23, which is supplied with steam by a conduit 24 and an extractor 25. Heat exchanger 23 is provided with a waste conduit 26 and a conduit 28 which leads to a separating chamber 27. A conduit 29 controlled by means of a valve 30 leads from the bottom of the separating chamber to the pump 21 and on to a conduit 31, flow through this conduit being controlled by means of a valve 32.

Raw marble in the form of chippings of maximum size about 10 mm is introduced into dry rotary roller grinder 1 in which grinding takes place. A current of air is forced in through the perforated base of the grinder chamber (not shown) and finely ground particles elutriated from the grinding chamber pass through the conduit 2 to the cyclone 3 where insufficiently ground particles are separated and returned to the grinding chamber while sufficiently ground particles are conveyed through the conduit 4 to the mixing tank 5. Generally, particles having a diameter not greater than about 50 μm are considered to be sufficiently finely ground. To the mixing tank 5 are supplied water through the conduit 6 and a solution of a dispersing agent through the conduit 7.

A homogeneous, dispersed suspension containing about 55–65% by weight of dry marble particles is transferred by means of the pump 8 through the conduit 9 to the top of the first wet attrition grinder 10 which is charged with granules of silica sand having sizes in the range from 0.25 to 0.5 mm. A suspension of finely ground marble flows through the sieve 11 at the bottom of the grinder and is transferred by means of the pump 12 through the conduit 13 to the second wet attrition grinder 14 which is charged with similar silica sand to that used in the first grinder. The fine product suspension from the second grinder flows through the sieve 15 and is transferred by means of the pump 16 through the conduit 17 to the third wet attrition grinder 18. Water may be added to each wet attrition grinder through the conduit 6 to maintain the solids content of the suspension within the range from 55 to 65% by weight of dry marble. Similarly dispersing agent may be added to any of the wet attrition grinders through the conduit 7 in order to keep the viscosity of the suspension as low as possible.

The suspension of finely ground marble produced by the third wet attrition grinder is withdrawn through the sieve 19 and the conduit 20 by means of the pump 21, flow through the conduit 20 being controlled by means of the valve 22. The pump 21 passes the suspension through a first side of the plate and frame heat exchanger 23, steam being supplied under pressure to a second side through the conduit 24 and an extractor 25. Condensate is discharged to waste from the second side of the heat exchanger through the conduit 26 and heated suspension is transferred under pressure to the separating chamber 27 from which water vapour is withdrawn through a conduit 28 by the extractor 25 which serves to maintain a vacuum of the order of −0.93 bar in the separating chamber. A concentrated suspension of fine marble is withdrawn from the bottom of the separating chamber through the conduit 29 by the pump 21, flow through the conduit 29 being controlled by means of the valve 30. Part of the concentrated suspension of fine marble is mixed with the product suspension from the third wet attrition grinder and recirculated to the heat exchanger 23, and part may be finally discharged from the recirculating system through the conduit 31, flow through this conduit being controlled by means of the valve 32.

The invention will now be illustrated by the following examples.

EXAMPLE 1

A suspension was prepared containing 60% by weight of ground marble substantially all of the particles of which were smaller than 53 μm and 0.7% by weight, based on the weight of dry marble, of a sodium polyacrylate dispersing agent of number average molecular weight about 4,000. The suspension was introduced into an attrition grinding mill and the marble was ground with Ottawa sand having granules in the size range from 0.25 to 0.5 mm, the weight ratio of sand to marble being 2:1. The suspension was pumped continuously from a stirred holding vessel, through the attrition grinding mill and back into the holding vessel. The amount of energy dissipated in the suspension in the attrition grinding mill was measured by means of a torque transducer and a voltage/time integrator.

At intervals during the grinding small samples of the suspension were withdrawn by means of a pipette and the particle size distribution of each suspension sample was measured by means of a Micromeritics "SEDIGRAPH". The grinding was continued until the product contained at least 93% by weight of particles which had an equivalent spherical diameter smaller than 1 μm. The solids content of the suspension was measured on completion of the Grinding and was found to be 62% by weight of dry marble.

The suspension of finely ground marble was separated from the sand and 2.5 liters of this suspension was transferred to a 5 liter Glass Buchner flask. An airtight stopper was placed into the neck of the flask and the side arm of the flask was connected to a source of vacuum at a pressure of 700 mm of mercury below atmospheric pressure (−0.933 bar). The flask was then immersed in a water bath at 75° C. and shaken from time to time to maintain the uniformity of the suspension. After 3 hours the solids content of the suspension was measured and was found to have risen to 73.5% by weight.

A sample of the suspension produced by the above method was flocculated and dewatered by filtration and the resultant cake was dried in an oven at 80° C. The dry cake was pulverised and the reflectance to light of wavelengths 457 and 570 nm, respectively, was measured. The solids content of the suspension, the percentage by weight of particles of finely Ground marble which had equivalent spherical diameters smaller than 2 μm and 1 μm, respectively, and the amount of energy dissipated in the suspension during the grinding were also recorded. The results obtained are set forth in Table 1 below.

EXAMPLE 2 (COMPARATIVE)

A suspension was prepared containing 75% by weight of the same ground marble as was used in Example 1 and 0.7% by weight, based on the weight of dry marble, of the same sodium polyacrylate dispersing agent as was used in Example 1. The suspension was introduced into an attrition grinding mill charged with Ottawa sand having granules in the size range from 0.5 to 1.0 mm. The weight ratio of sand to dry marble was 2:1. Grinding was continued until 82% by weight of the particles had an equivalent spherical diameter smaller than 1 μm. It was found to be impracticable to grind the marble any more finely by this method because the viscosity of the suspension increased to the point at which no further grinding was possible. The suspension of finely ground marble was separated from the sand by sieving.

A sample of the suspension produced by the method of this example was treated as in Example 1 above and the results obtained are set forth in Table 1 below.

TABLE 1

|  | Product of method of invention (Ex. 1) | Product of comparative method (Ex. 2) |
| --- | --- | --- |
| % by weight of particles smaller than 2 μm e.s.d. | 98 | 95 |
| % by weight of particles smaller than 1 μm e.s.d. | 93 | 82 |
| % reflectance to light of 457 nm wavelength | 92.9 | 92.1 |
| % reflectance to light of 570 nm wavelength | 94.0 | 93.1 |
| % by weight of dry marble | 73.5 | 76.0 |
| Energy dissipated (kWh/tonne) | 300 | 345 |

Each of the two suspensions of finely ground marble prepared in Examples 1 and 2 was incorporated into a paper coating composition having the formulation shown in Table 2 below.

TABLE 2

| Ingredient | Parts by weight |
| --- | --- |
| Pigment | 100 |
| Styrene butadiene latex adhesive | 11 |
| Sodium carboxymethyl cellulose | 0.5 |
| Cross linking agent "URECOL SMV" | 0.7 |
| Defoamer | 0.7 |
| Optical brightening agent | 0.7 |

The ingredients were added in turn, in the order given above, to each of the two suspensions. Finally there was added to each paper coating composition sufficient sodium hydroxide to raise the pH to within the range from 8.5 to 9.0.

Each composition was coated on to a pre-coated, wood-free base paper of weight 86 g.m$^{-2}$ using a laboratory paper coating machine of the type described in British Patent Specification No. 2225261 at a paper speed of 600 m.min$^{-1}$ and at a series of different blade pressures to give different coat weights.

Each batch of coated paper was conditioned for 16 hours at 23° C. and 50% relative humidity and was then subjected to supercalendering by passing it ten times between the rolls of a laboratory supercalender at a speed of 36 m.min$^{-1}$, a line pressure of 89 kg cm$^{-1}$ and a temperature of 65° C. The supercalendered paper before testing was again conditioned for 16 hours at 23° C. and 50% relative humidity.

The batches of coated paper were tested for gloss before and after calendering by the method laid down in TAPPI Standard No. T480ts-65 by means of the Hunterlab D16 gloss meter. They were also tested for percentage reflectance to light of wavelengths 457 and 570 nm, respectively. Each measured property was plotted graphically against coat weight, and the value of the property for a coat weight of 12 g.m$^{-2}$ was found by interpolation. The results obtained are set forth in Table 3 below.

TABLE 3

|  | Product of method of invention (Ex. 1) | Product of comparative method (Ex. 2) |
| --- | --- | --- |
| Gloss (uncalendered) | 29 | 24 |
| Gloss (calendered) | 68 | 64 |
| % reflectance to light of wavelength 457 nm | 87.4 | 87.0 |
| % reflectance to light of wavelength 570 nm | 88.8 | 88.4 |

EXAMPLE 3

A suspension containing 59.4% by weight of ground marble substantially all of the particles of which were smaller than 53 μm and 0.68% by weight, based on the weight of dry marble, of the same sodium polyacrylate dispersing agent as was used in Example 1 was introduced into a series of three attrition grinding mills as shown in the Figure at a rate of 45.0 liters per minute.

Water was added to each of the three attrition grinding mills to replace water which was lost through evaporation and to keep the percentage by weight of solids in the suspension in the range from 59.5 to 61.5% by weight. The grinding medium consisted of grains of silica sand of sizes in the range from 0.25 to 0.5 mm. and the weight ratio of sand to dry marble was maintained at about 2:1. The total amount of energy dissipated in the three attrition grinding mills was recorded. The product suspension from the third attrition grinding mill was introduced into a forced circulation evaporation plant of the type shown in the Figure at a rate of 3,000 liters per hour. Steam was introduced into the second side of the heat exchanger at a pressure of 2.5 bar and a vacuum of −0.93 bar was maintained in the separating chamber. The evaporation was continued until the solids content of the suspension had increased to 74.7% by weight.

A sample was taken from the product suspension and was tested for the percentage by weight of particles having an equivalent spherical diameter smaller than 2 µm, 1 µm and 0.25 µm, respectively. The results obtained are set forth in Table 4 below.

EXAMPLE 4

The experiment described in Example 3 above was repeated except that the feed suspension contained 0.76% by weight of the sodium polyacrylate dispersing agent, based on the weight of dry marble, and, in order to achieve a finer product, was passed through the three attrition grinding mills at the slower rate of 20.0 liters per minute. Steam was introduced into the second side of the heat exchanger at a pressure of 2.0 bar in this case and the final solids content of the suspension was 74.6% by weight. A sample was taken from the product suspension and tested as in Example 3. The results obtained are set forth in Table 4 below.

EXAMPLE 5 (COMPARATIVE)

A suspension was prepared containing 75% by weight of the same ground marble as was used in Examples 3 and 4 and 0.68% by weight of the same sodium polyacrylate dispersing agent. The suspension was introduced into the series of three attrition grinding mills employed in Examples 3 and 4 at a rate of 24.3 liters per minute and water was added to each attrition grinding mill to replace water lost through evaporation and to maintain the solids content within the range from 74.5 to 76.5% by weight. The solids content of the product suspension of the third attrition grinding mill was found to be 76.5% which was a suitable value for a suspension of finely ground marble for incorporation in a paper coating composition.

A sample was taken from the product suspension and was tested as in Example 3. The results obtained are set forth in Table 4 below.

TABLE 4

|  | Product of Example 3 | Product of Example 4 | Product of Example 5 |
| --- | --- | --- | --- |
| % by weight of particles smaller than 2 µm e.s.d | 96 | 99 | 96 |
| % by weight of particles smaller than 1 µm e.s.d. | 78 | 95 | 78 |
| % by weight of particles smaller than 0.25 µm e.s.d. | 23 | 43 | 30 |
| Energy dissipated during grinding (kWh · tonne$^{-1}$) | 173 | 395 | 222.5 |

It will be seen that the product of Example 3 (Invention) has a very similar particle size distribution to that of the product of Example 5 (Comparative) but required less energy in the grinding stage to produce a calcium carbonate pigment of this particle size distribution. It was not possible to produce a calcium carbonate pigment having a particle size distribution corresponding to that of the product of Example 4 by the method described under Example 5.

EXAMPLE 6

A suspension was prepared containing 68% by weight of the same ground marble as was used in Example 1 and 0.71% by weight, based on the weight of dry marble, of the same sodium polyacrylate dispersing agent. The suspension was introduced at a rate of 31 liters per minute into a series of three attrition grinding mills which were charged with silica sand of grain size in the range from 0.25 to 0.5 mm, the weight ratio of sand to dry marble being maintained at about 2:1. In this experiment water was not added to replace water lost through evaporation, and the solids content of the suspension was allowed to rise as the grinding proceeded. A sample of the product suspension from the third attrition grinding mill was tested for the percentages by weight of particles having an equivalent spherical diameter smaller than 2 µm, 1 µm and 0.25 µm, respectively and the amount of energy dissipated in the suspension to produce this particle size distribution was recorded. The final solids content of the suspension was also recorded.

The results obtained are set forth in Table 5 below, together with the results obtained for of Example 5 as a comparison.

TABLE 5

|  | Product of Example 6 | Product of Example 5 |
| --- | --- | --- |
| Initial solids content (%) | 68 | 74.5 |
| Final solids content (%) | 75.4 | 76.5 |
| % by weight of particles smaller than 2 µm e.s.d. | 96 | 96 |
| % by weight of particles smaller than 1 µm e.s.d. | 78 | 78 |
| % by weight of particles smaller than 0.25 µm e.s.d. | 28 | 30 |
| Energy dissipated during grinding (kWh · tonne$^{-1}$) | 201 | 222.5 |

It can be seen that, by the method of the invention, a calcium carbonate pigment having a particular fine particle size distribution can be with produced a saving of about 10% of the energy dissipated during the grinding step as compared with the method of Example 5.

What is claimed is:

1. A process for producing a finely ground alkaline earth metal pigment comprising the steps of:

(a) preparing an aqueous suspension comprising from 40 to 70% by weight of a particulate alkaline earth metal compound;

(b) subjecting the suspension formed in step (a) to attrition grinding with a particulate grinding medium under conditions such as to yield a product having a particle size distribution such that at least 90% by weight of the particles have an equivalent spherical diameter smaller than 2 µm; and (c) allowing water to evaporate from the suspension under the action of heat contained in the suspension until the percentage by weight of dry alkaline earth metal compound in the suspension is at least 70% by weight.

2. A process according to claim 1, wherein the alkaline earth metal compound is an alkaline earth metal carbonate or sulphate.

3. A process according to claim 1, wherein, in step (a), the alkaline earth metal compound has a particle size distribution such that substantially all of the particles are smaller than 100 µm.

4. A process according to claim 1, wherein, in step (a), the alkaline earth metal compound has a particle size distribution such that substantially all of the particles are smaller than 53 µm.

5. A process according to claim 1, wherein, in step (a), the aqueous suspension includes a dispersing agent for the alkaline earth metal compound, in an amount effective to disperse the particles of the particulate material.

6. A process according to claim 1, wherein, in step (b), the suspension is subjected to attrition grinding under conditions such as to yield a product having a particle size distribution such that at least 80% by weight of the particles have an equivalent spherical diameter smaller than 1 µm.

7. A process according to claim 1, wherein the particulate grinding medium consists of particles having an average particle diameter in the range from 0.1 to 5.0 mm.

8. A process according to claim 1, wherein the grinding is carried out in two or more stages.

9. A process according to claim 1, wherein, in step (c), the heat under whose action water is allowed to evaporate from the suspension is that which has been generated in the suspension as a direct result of the attrition grinding carried out in step (b).

10. A process according to claim 1, wherein the heat contained in the suspension as a result of the energy dissipated in the suspension during grinding is sufficient to increase the percentage by weight of dry alkaline earth metal compound in the suspension to at least 70% by weight.

11. A process according to claim 1, wherein the suspension is heated by a heating means to a temperature within the range of from 50° C. to the boiling point of the suspension.

12. A process according to claim 11, wherein the heating means is a heat exchanger.

13. A process according to claim 1, wherein, in addition to the heat contained in the suspension as a result of the grinding step, the suspension is heated by a heating means to a temperature within the range of from 50° C. to the boiling point of the suspension.

14. A process according to claim 13, wherein the heating means is a heat exchanger.

15. A process for producing a finely ground alkaline earth metal pigment comprising the steps of:

(a) preparing an aqueous suspension comprising from 40 to 70% by weight of a particulate alkaline earth metal compound having a particle size distribution such that substantially all of the particles are smaller than 100 µm and a dispersing agent for the alkaline earth metal compound;

(b) subjecting the suspension formed in step (a) to attrition grinding with a particulate grinding medium having an average particle diameter in the range from 0.1 to 5.0 mm under conditions such as to yield a product having a particle size distribution such that at least 80% by weight of the particles have an equivalent spherical diameter smaller than 1 µm; and (c) allowing water to evaporate from the suspension under the action of heat contained in the suspension until the percentage by weight of dry alkaline earth metal compound in the suspension is at least 70% by weight.

16. A process for producing a finely ground alkaline earth metal pigment comprising the steps of:

(a) preparing an aqueous suspension comprising from 40 to 70% by weight of a particulate alkaline earth metal compound;

(b) subjecting the suspension formed in step (a) to attrition grinding with a particulate grinding medium under conditions such as to yield a product having a particle size distribution such that at least 90% by weight of the particles have an equivalent spherical diameter smaller than 2 µm; and (c) allowing the water to evaporate from the suspension by heating the suspension by a heating means to a temperature within the range of from 50° to the boiling point of the suspension until the percentage by weight of dry alkaline earth metal compound in the suspension is at least 70% by weight.

* * * * *